(12) United States Patent
Troia et al.

(10) Patent No.: US 11,449,524 B2
(45) Date of Patent: Sep. 20, 2022

(54) PARKING INFRASTRUCTURE POWERED BY A DECENTRALIZED, DISTRIBUTED DATABASE

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 458 days.

(21) Appl. No.: 16/201,652

(22) Filed: Nov. 27, 2018

(65) Prior Publication Data

US 2020/0167365 A1     May 28, 2020

(51) Int. Cl.
| | |
|---|---|
| G07B 15/00 | (2011.01) |
| G06F 16/27 | (2019.01) |
| H04L 67/104 | (2022.01) |
| G06Q 10/02 | (2012.01) |
| G06F 16/22 | (2019.01) |
| H04L 9/00 | (2022.01) |

(52) U.S. Cl.
CPC ............ *G06F 16/27* (2019.01); *G06F 16/22* (2019.01); *G06Q 10/02* (2013.01); *H04L 67/104* (2013.01); *G07B 15/00* (2013.01); *H04L 9/50* (2022.05)

(58) Field of Classification Search
CPC ............ G06Q 10/02; G06Q 2240/00; G07B 15/00–15/02
See application file for complete search history.

(56) References Cited

U.S. PATENT DOCUMENTS

| | | |
|---|---|---|
| 7,349,871 B2 | 3/2008 | Labrou et al. |
| 7,353,382 B2 | 4/2008 | Labrou et al. |
| 7,606,560 B2 | 10/2009 | Labrou et al. |

(Continued)

FOREIGN PATENT DOCUMENTS

WO     2017190794     11/2017

OTHER PUBLICATIONS

Hussein, et al., A Community-Driven Access Control Approach in Distributed IoT Environments, IEEE Communications Magazine, Mar. 2017, pp. 146-153 (Year: 2017).*

(Continued)

*Primary Examiner* — Daniel Vetter
(74) *Attorney, Agent, or Firm* — Greenberg Traurig LLP

(57) ABSTRACT

A parking system having parking lots and server computers configured to control access to the parking lots. The server computers are connected via a communications network to form a peer to peer network of computing nodes. The peer to peer network of computing nodes hosts a decentralized, distributed database that stores activity records of parking spaces in the parking lots. The peer to peer network can include vehicles planning to use parking services of the parking lots and/or mobile devices connected to infotainment systems of the vehicles. Alternatively, the peer to peer network is formed by parking applications running in the vehicles and/or the mobile devices. The records in the decentralized, distributed database provide parking space availability information and/or can be used to regulate and/or plan parking reservation, usage, and navigational guidance to reach available parking spaces.

16 Claims, 4 Drawing Sheets

(56) References Cited

U.S. PATENT DOCUMENTS

| | | |
|---|---|---|
| 7,784,684 B2 | 8/2010 | Labrou et al. |
| 7,801,826 B2 | 9/2010 | Labrou et al. |
| 7,822,688 B2 | 10/2010 | Labrou et al. |
| 2004/0030894 A1 | 2/2004 | Labrou et al. |
| 2004/0098350 A1 | 5/2004 | Labrou et al. |
| 2004/0107170 A1 | 6/2004 | Labrou et al. |
| 2005/0027543 A1 | 2/2005 | Labrou et al. |
| 2005/0187873 A1 | 8/2005 | Labrou et al. |
| 2006/0206709 A1 | 9/2006 | Labrou et al. |
| 2007/0022058 A1 | 1/2007 | Labrou et al. |
| 2017/0098374 A1 | 4/2017 | Sullivan et al. |
| 2017/0255881 A1 | 9/2017 | Ritch et al. |
| 2018/0181768 A1* | 6/2018 | Leporini ................. G06F 21/31 |
| 2018/0268617 A1* | 9/2018 | Bruce .................... G08G 1/142 |
| 2018/0270244 A1 | 9/2018 | Kumar et al. |
| 2018/0315309 A1* | 11/2018 | Becker .................. H04L 9/0643 |
| 2019/0165932 A1* | 5/2019 | Vincent ................ G06Q 20/065 |
| 2019/0325522 A1* | 10/2019 | Bathia ................. G06K 9/00624 |
| 2019/0375373 A1* | 12/2019 | Pepe .................... H04L 9/3247 |
| 2019/0385096 A1* | 12/2019 | Ibrahim .............. G07F 17/0014 |
| 2021/0097795 A1* | 4/2021 | Manchovski ........... H04L 9/088 |

OTHER PUBLICATIONS

International Search Report and Written Opinion, PCT/US2019/062655, dated Mar. 16, 2020.
Blockchain, Wikipedia, printed on Oct. 30, 2018.
Hashcash, Wikipedia, printed on Oct. 30, 2018.
Merkle tree, Wikipedia, printed on Oct. 30, 2018.
Extended European Search Report, EP19888881.0, dated Mar. 17, 2022.

* cited by examiner

PARKING INFRASTRUCTURE POWERED BY A DECENTRALIZED, DISTRIBUTED DATABASE

FIELD OF THE TECHNOLOGY

At least some embodiments disclosed herein relate to parking infrastructure in general, and more particularly, but not limited to smart parking infrastructure powered by a decentralized, distributed database.

BACKGROUND

U.S. Pat. App. Pub. No. 2012/0236149, entitled "Parking Lot," discloses a parking lot that has cameras to read the license plates of parked vehicles via optical character recognition (OCR) and radio beacons to read out the radio IDs carried on the vehicles. A central computer is configured to store parking space reservations in association with vehicle license numbers and radio IDs. The identification of an entering vehicle takes place via radio, while the localization and validation of the vehicle in the parking space is realized with OCR of license plates. When the parking space is equipped with electric vehicle charging stations, the central computer can unlock the charging station for charging a vehicle after successfully checking the vehicle license number signaled by the camera of the respective parking space, such that the improper use of charging stations is precluded.

U.S. Pat. App. Pub. No. 2008/0033769, entitled "Personalized Parking and Reservation System," discloses a parking facility having a ticket dispenser and parking space sensors and aisle sensors to detect the movements of vehicles in the parking facility. The ticket dispenser permits entry of parking space preference information. Based on the personal preference of a parking patron, a computer is configured to identify a recommended parking space, and send the location of the recommended parking space to the ticket dispenser. The ticket dispenser prints a map and textual instructions after the parking authorization.

U.S. Pat. App. Pub. No. 2014/0195282, entitled "Computer-Implemented System and Method for Offering Customer Priority Parking Reservations," discloses a system that has a vehicle occupancy sensor to sense occupancy of a parking space by a motor vehicle, a smart parking device to determine an identity of the driver of the motor vehicle, and parking availability indicators associated with the reserved parking spaces that are activated throughout the reservation period in a merchant priority parking mode.

U.S. Pat. App. Pub. No. 2014/0350855, entitled "Systems and Methods for Providing Navigational Assistance to Reserved Parking Locations," discloses a system that when a vehicle is detected to be occupying a parking space different from a space reserved for the vehicle and the parking space is not available for the vehicle, presents a prompt requesting the vehicle to be moved to an alternative parking space via a parking application running in a user access device.

U.S. Pat. App. Pub. No. 2017/0255881, entitled "Systems and Methods of Controlling Digital Signage for Directing Parking Traffic," discloses a parking lot having at least one device to identify occupancy statuses of parking spaces and display devices controlled by a server to present navigational guidance based on parking reservations.

A blockchain is a growing list of records/blocks that are linked using cryptography. Each block can contain a cryptographic hash of the previous block, a timestamp, and data. The linked blocks can generally be represented as a Merle tree root hash. The blockchain can be hosted on a network of computers as a decentralized, distributed and public digital ledger.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to a smart parking infrastructure powered by a decentralized, distributed database.

For example, the decentralized, distributed database can be implemented using a blockchain technique to allow public access by autonomous vehicles (and/or manually driven vehicles) during parking related activities, such as making parking reservation, driving to parking lots, entering parking lots, locating available/reserved parking spaces/spots, occupying parking spaces, vacating parking spaces, exiting parking lots, making payments for parking, etc.

Figure 1:
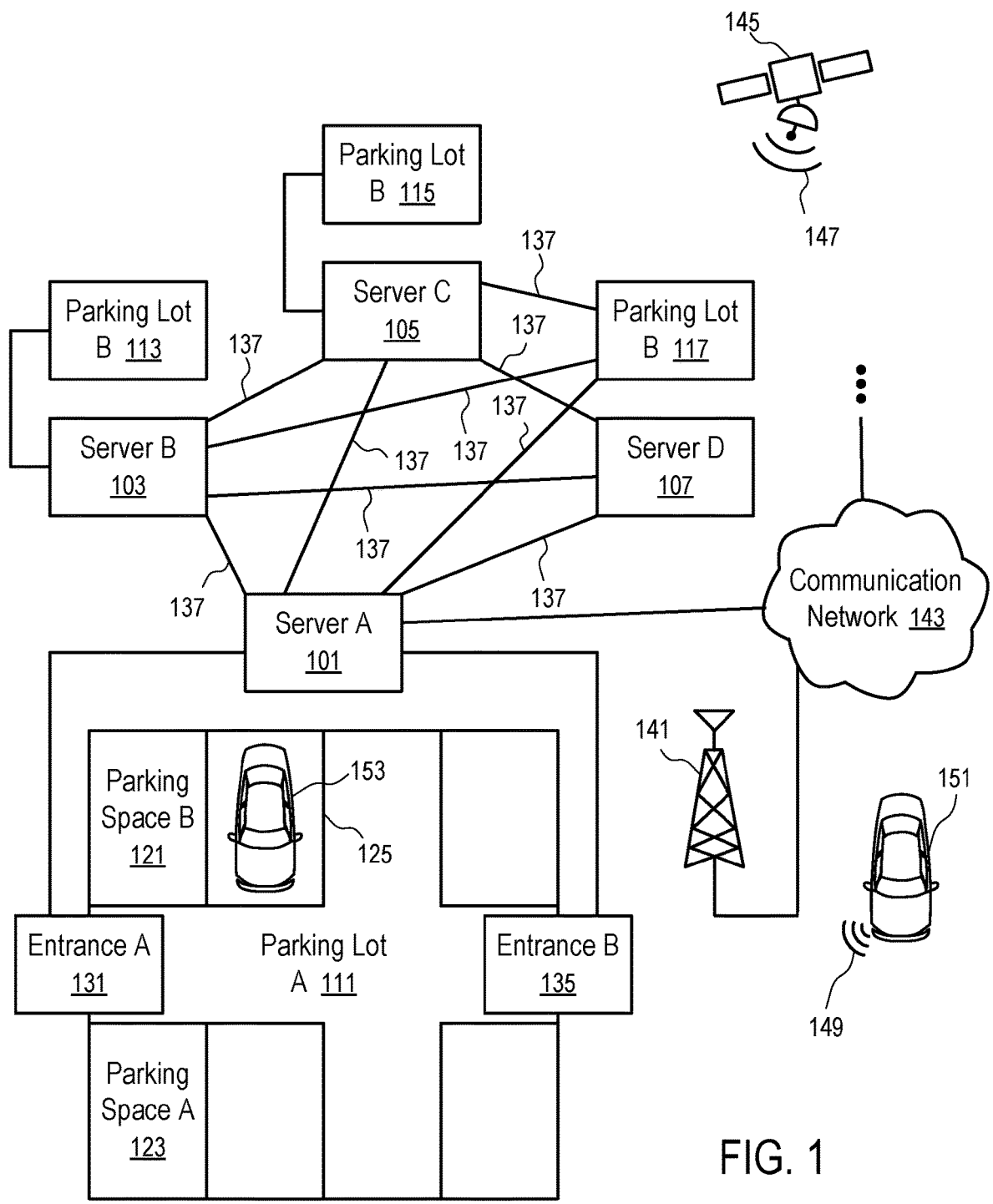
FIG. 1 illustrates a parking infrastructure having a decentralized, distributed database to manage parking related activities according to one embodiment.

FIG. 1 illustrates a parking infrastructure having a decentralized, distributed database to manage parking related activities according to one embodiment.

The parking infrastructure illustrated in FIG. 1 includes a set of parking lots (111, 113, 115, and 117). In general, a parking infrastructure can have more or less parking lots as illustrated in FIG. 1.

For example, the set of parking lots (111-117) can be different levels/floors of a parking structure/building.

For example, the set of parking lots (111-117) can be separate parking structures/buildings of a parking service provider.

For example, the set of parking lots (111-117) can be separate parking structures/buildings servicing a same area, a city, a company or shopping mall, a point of interest, a tourist destination, etc.

For example, the set of parking lots (111-117) can be provided by a coalition of different parking service providers located in a same geographical area, a city, a state, or a country.

A typical parking lot (111) can have an associated server (101). The server (101) can provide functions to manage the parking lot (111), such as controlling gates at entrances (e.g., 131 and 135), detecting occupancy status of parking spaces (e.g., 121, 123, 125, . . . ), detecting identities of vehicles entering the parking lot (121) and/or occupying the parking spaces (e.g., 125), processing payments and/or reservations, etc.

A communication network (143) connects the servers (e.g., 101, 103, 105, and 107) of the parking lots (e.g., 111-117). Peer-to-peer connections among the servers (101-107) allows the servers to communicate with each other to implement a decentralized, distributed database (e.g., using a blockchain technique).

Optionally, a set of vehicles (e.g., 151 and 153) can join the peer-to-peer network of servers (101-107) to access the services of the servers (101-107) and/or to access the parking records stored in the decentralized, distributed database.

Examples of parking records include records of vehicles (e.g., 151 and 153) making reservations for parking in the lots (111-117), entering the parking lots (111-117), initiating payments for parking services upon entering the parking lots, occupying parking spaces (e.g., 121-125), leaving parking spaces (e.g., 121-125), exiting parking lots (111-117), finalizing payments for parking services upon exiting the parking lots (111-117), etc.

For example, a vehicle (e.g., 153) inside or near the parking lot (111) can establish a peer-to-peer connection with the server (101) of the parking lot (111), or another server (e.g., 103, 105, 107), through a wireless local area connection provided in the parking lot (111), a base station or access point (e.g., 141), and/or a communication network (143). A range limitation of the wireless connection can be used to identify the location of the vehicle (e.g., 153). The connection can be used to request permission for entering the parking lot (111), initiating parking payment, confirming parking in a parking space (e.g., 125), reporting leaving the parking lot (111), finalizing parking payment, etc.

For example, a vehicle (e.g., 151) outside of the parking lot (111) can establish a peer-to-peer connection with the server (101) of the parking lot (111), or another server (e.g., 103, 105, 107), a base station or access point (141) and/or a communication network (143). The connection can be used to make a reservation request.

In one embodiment, a vehicle (e.g., 153) has a parking application integrated in an autonomous driving system or an advanced driver-assistance system. The parking application can make a connection to the peer-to-peer network of servers (101-107) to access the records stored in the peer-to-peer network. Thus, the autonomous vehicle (e.g., 153) can make a parking reservation, drive to a parking lot (111), locate a parking space (125), and/or pay the parking fee in an autonomous mode without human assistance.

In another embodiment, a mobile device runs a parking application that can make a connection to the peer-to-peer network of servers (101-107) to access the records stored in the peer-to-peer network. When the mobile device is connected to an infotainment system of a vehicle, the parking application can make a parking reservation, provide navigational guidance to the driver for driving to a parking lot (111) and/or locate a parking space (125), and/or pay the parking fee.

Optionally, the vehicles and/or mobile devices interested in the services of the parking lots (111-117) can also join the peer-to-peer network to host the parking related records in the decentralized, distributed database (e.g., implemented using a blockchain technique).

Optionally, selected types of parking records can be hosted in a peer-to-peer network of vehicles and mobile devices without hosting such records on the servers (101-107).

In one implementation, each of the servers (101-107) functions as a computing node on the peer-to-peer network to host a decentralized, distributed database (e.g., implemented using a blockchain technique). The decentralized, distributed database is configured to store redundant copies of activity records related to parking. For example, each respective server (101-107) can broadcast a parking activity record in the peer to peer network to cause one or more additional nodes in the peer to peer network to store the parking activity record in the decentralized, distributed database having a copy of the parking activity record maintained by each of the one or more additional nodes. The servers (101-107) can control the parking lots (111-117) based at least in part on network consensus on the activity records stored in the decentralized, distributed database. For example, each computing node in the network can independently determine the validity of a record based on copies of records stored in the computing node; when a majority of active nodes in the peer to peer network approves the validity of a parking activity record, the peer-to-peer network can reach network consensus that the parking activity record is valid; and the validated parking activity record can be used to control reservation, access control, vacancy management, navigational guidance, etc.

For example, each parking space (e.g., 121) can be represented by a digital token; and the peer-to-peer network can be used to manage the inventory, reservation and/or transfer of the digital tokens to/from parking applications representing users of parking spaces. Parking applications can be configured as part of advanced driver-assistance systems of vehicles, part of autonomous driving systems of vehicles, and/or as mobile applications running on mobile devices that are connected to infotainment systems of the vehicles. For example, a parking activity record identifying the reservation of a digital token by a parking application can be used to indicate the reservation of a parking space represented by the digital token; and a parking activity record identifying the transfer of a digital token from a server to a parking application can be used to indicate the occupation of a parking space represented by the digital token by a vehicle corresponding to the parking application.

Optionally, the computing devices on which some of the parking applications are configured can dynamically join and leave the peer-to-peer network to participate in the hosting of the decentralized, distributed database. Such computing devices can include wireless mobile devices connected to infotainment systems of the vehicles, advanced driver-assistance systems of vehicles, autonomous driving systems of vehicles. Each of such computing devices can join the peer-to-peer network to receive copies of parking activity records, become an active node of the peer-to-peer network, participate in network consensus determination.

In some instances, the population of the computing devices of the users or potential users of the parking spaces can be sufficient to maintain the decentralized, distributed database; and the servers (101-107) can use the records (e.g., reservation and inventory) in the decentralized, distributed database without having to store copies of the records on the servers (101-107). For example, the peer-to-peer network of user computing devices can maintain records of digital tokens of parking spaces that have not yet been occupied, parking spaces that have not yet been reserved, decentralized, distributed database that have been reserved by users/vehicles, and decentralized, distributed database that have been occupied by users/vehicles. Thus, the servers (101-107) do not have to involve in the reservation and inventory management of the parking spaces. The servers (101-107) can use the records in the decentralized, distributed database and/or the network consensus to control aspects of the parking lots (111-117), such as granting gate access to a vehicle having a reservation validated by the network, providing navigational guidance to a parking space (121) reserved by the vehicle, and/or confirming/announcing the non-availability of a parking space (121), etc.

Figure 2:
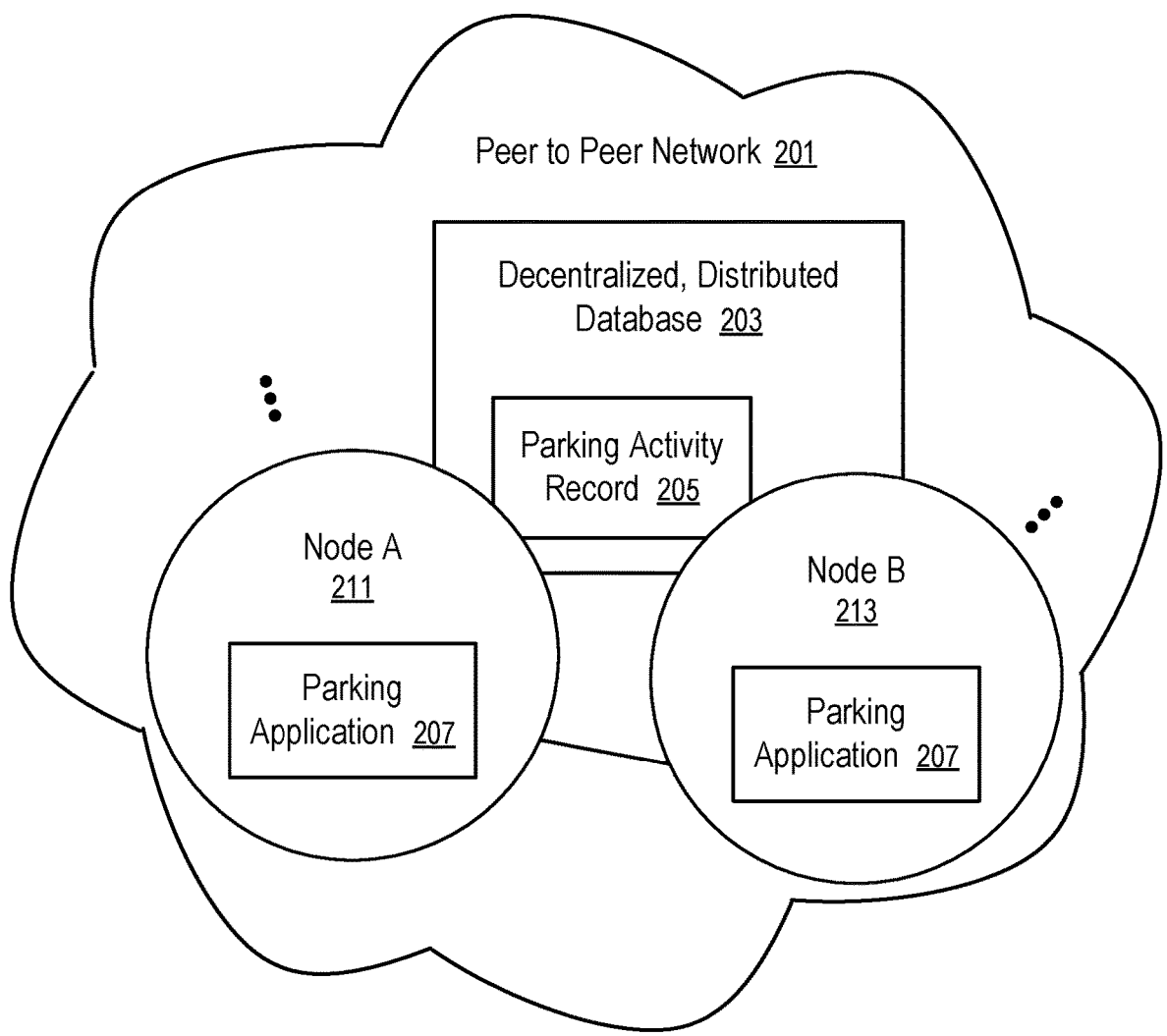
FIG. 2 illustrates a decentralized, distributed database to store an activity record related to parking according to one embodiment.

FIG. 2 illustrates a decentralized, distributed database to store an activity record related to parking according to one embodiment. For example, the decentralized, distributed database of FIG. 2 can be used in the implementation of the parking infrastructure illustrated in FIG. 1.

In FIG. 2, a peer to peer network (201) includes computing nodes (e.g., 211, 213, ... ) that are connected via peer to peer communication connections.

For example, a node (e.g., 211 or 213) can be a server (e.g., 101, 103, 105 or 107 in FIG. 1), or a vehicle (e.g., 151 or 153), or a mobile device of a driver or passenger of a vehicle (e.g., 151 or 153).

The decentralized, distributed database (203) of FIG. 2 is hosted on the peer to peer network (201) of nodes (e.g., 211, 213, ... ).

For example, when a parking activity record (205) is created, a node having the record (205) can broadcast the record (205) in the peer to peer network (201); and the record (205) can propagate in the peer to peer network (201) such that redundant copies of the record (205) are stored in nodes (e.g., 211 or 213) that receive the record (205). Redundant copies of the record (205) can be stored in some or all of the nodes (e.g., 211 or 213) in the peer to peer network (201).

The peer to peer network (201) can validate a record (205) based on network consensus. For example, when the majority of nodes (e.g., 211, 213) approves the validity of a record (205), the record (205) is accepted.

Optionally, a parking activity record (205) involving two computing devices (e.g., a server (101) and a vehicle (153)) can have digital signatures of the computing devices for authenticity. The nodes (e.g., 211, 213) in the peer to peer network (201) can independently validate the authenticity of the digital signatures.

Optionally, a new parking activity record (205) can be linked in cryptography to a prior parking activity record by including a hash of the prior parking activity record. Since a modification of the prior parking activity record can be detected from checking against the hash in the new parking activity record (205), the creation and distribution of the subsequent parking activity records and network consensus can be used to effectively prevent tampering of activity records stored in the decentralized, distributed database (203).

For example, a parking space (125) can be represented by a digital token; and the possession of the token can be limited by the decentralized, distributed database (203) to one parking application (207) at a time. When the token is transferred to a parking application (207) of a node (211) representing a server (101), the parking space (125) is freed and available for reservation and/or occupation. When the token is transferred to a parking application (207) of a node (211) representing a vehicle (153) (or a mobile device), the parking space (125) is occupied by the vehicle (153).

For example, when the digital token representing the parking space (125) is acquired by the server (101) according to the network consensus of the decentralized, distributed database (203), the digital token may be reserved by a parking application (207) of a vehicle (153) for acquisition. The reservation transaction can be performed in response to a destination to be set to the parking lot (111) in a navigation system of the vehicle (153), or in response to an explicit user request, or in response to the distance between the parking lot and the vehicle (153) being shorter than a threshold.

In some instances, the parking infrastructure and/or the parking application can allow multiple competing reservations for a parking space; and a set of predetermined rules can be implemented to select a reservation to be honored. For example, when the vehicle (153) having a reservation for the parking space (125) arrives at an entrance (e.g., 131 or 135) prior to the arrival of other vehicles having the reservation for the parking space (125), the reservation of the other vehicles can be invalidated and/or changed to reservations for other available parking spaces (e.g., 121 or 123).

For example, the arrival of the vehicle (153) at the entrance (e.g., 131 or 135) can be detected via a secure message exchange between the server (101) and the vehicle (153) over a wireless local area network.

For example, the arrival of the vehicle (153) at the entrance (e.g., 131 or 135) can be detected via a camera at the entrance scanning the license plate of the vehicle (153).

For example, the arrival of the vehicle (153) at the entrance (e.g., 131 or 135) can be detected via a position report from the parking application of the vehicle (153). The position of the vehicle (153) can be determined using signals (147) from satellites (145) of a satellite positioning system (e.g., a global positioning system (GPS)), and/or from base stations or access points (e.g., 141).

Based on the position of the vehicle (153) in the parking lot (111), the parking application (207) can provide turn-by-turn guidance to lead the vehicle (153) to the parking space (125).

Upon detection of the vehicle (153) occupying the parking space (125), a transaction record can be generated in the decentralized, distributed database (203) for the transfer of the digital token of the parking space (125) from the parking application (207) of the server (101) to the parking application (207) of the vehicle (153).

Upon detection of the vehicle (153) leaving the parking space (125), a transaction record can be generated in the decentralized, distributed database (203) for the transfer of the digital token of the parking space (125) back to the parking application (207) of the server (101) from the parking application (207) of the vehicle (153).

In general, various parking rules, reservation rules, parking charges can be implemented via the detection of the parking related activities and the records in the decentralized, distributed database (203). Thus, the techniques are not limited to particular examples illustrated above.

Figure 3:
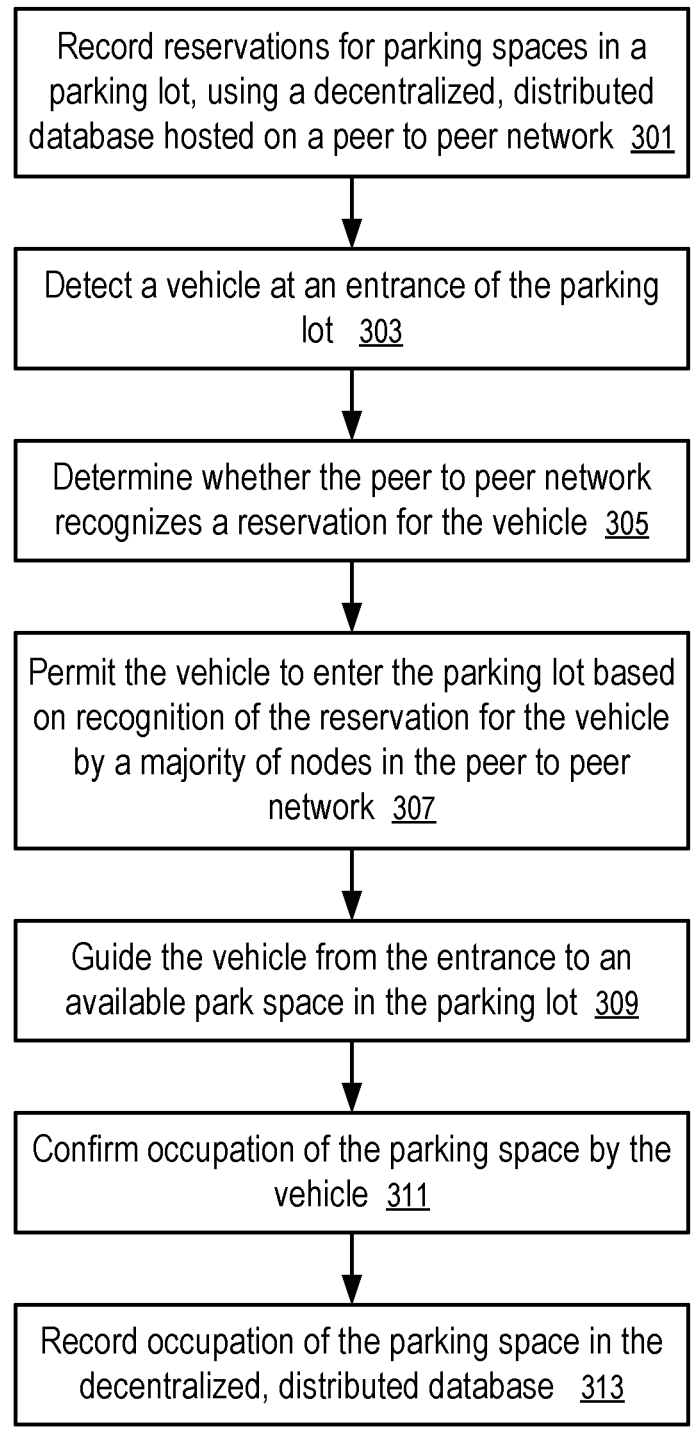
FIG. 3 shows a method to manage parking according to one embodiment.

FIG. 3 shows a method to manage parking according to one embodiment. For example, the method of FIG. 3 can be implemented in the parking infrastructure of FIG. 1 using a decentralized, distributed database of FIG. 2.

At block 301, a decentralized, distributed database (203), hosted on a peer to peer network (201), records reservations for parking spaces (e.g., 121, 123, 125, ... ) in a parking lot (e.g., 111).

In one example, the peer to peer network (201) can be formed using a set of server computers (101-107) of parking lots. Such a peer to peer network (201) may exclude vehicles (e.g., 151 and 153) and/or mobile devices of users/drivers.

In another example, the peer to peer network (201) can be formed using a set of vehicles (e.g., 151, 153) and/or mobile devices that are registered to use the parking services of the parking infrastructure illustrated in FIG. 1. Such a peer to peer network (201) may not include servers (101-107) as nodes to store redundant parking activity records. However, the servers (101-107) can provide other functions, such as detecting the presence of the vehicles (e.g., 151, 153) in and/or near the parking lots (e.g., 111).

In yet another example, the peer to peer network (201) can be formed using a set of vehicles (e.g., 151, 153) and/or mobile devices that are registered to use the parking services of a parking lot (e.g., 111). Different parking lots (111-117)

can have separate peer to peer networks for recording parking activities related to their parking spaces.

In a further example, the peer to peer network (201) can be formed using a combination of vehicles (e.g., 151, 153), registered mobile devices, and/or server computers (e.g., 101-107).

In some implementations, a vehicle (153), or a mobile device connected to the infotainment system of the vehicle (153), can dynamically join and leave the peer to peer network (201) based on the parking needs of the vehicle (153).

For example, the parking application (207) running in the vehicle (153), or a mobile device connected to the infotainment system of the vehicle (153), can join the peer to peer network (201) for the parking lot (111) when there is an interest in a parking space of the parking lot (111). Thus, a group of parking application (207) interested in the parking lot (111) can form the dynamic peer to peer network (201) to track and regulate the reservation and usage of the parking spaces in the parking lot (111), with or without the involvement of the server (101) of the parking lot (111).

In some instances, the server (101) signs an activity record using its private key such that the validity of the record can be validated independently the vehicles and mobile devices using the public key of the server (101); and a parking application involved in the record can publish the record in the peer to peer network (201) to allow regulation of parking activities among vehicles interested in the services of the parking lot (111). Optionally, the server (101) can also be part of the peer to peer network (201).

For example, a reservation can be made automatically by a parking application (207) in response to the destination of a navigational system of a vehicle (e.g., 151 or 153) being set to a parking lot (e.g., 111) or a point of interest near the parking lot (e.g., 111). The navigational system can be integrated within an autonomous vehicle, or a mobile device that is connected to the infotainment system of a vehicle.

For example, each respective parking space (e.g., 125) in the parking lots (111-117) can be represented by a digital token. Parking activity records (e.g., 205) can be configured to identify the transfer of the digital token to or from parking applications, as indication of the use and release of the parking space (e.g., 125) by vehicles.

For example, the server (101) and/or the vehicle (153) can broadcast (e.g., the parking application (207)), a record of reservation in the peer to peer network (201) to store copies of a parking activity record (205) for the reservation in the nodes (e.g., 211, 213, ... ) in the decentralized, distributed database (203). The parking application (207) can control parking activities based on the records stored in the decentralized, distributed database (203), by managing availability, reservation, approval, etc.

At block 303, a server (e.g., 101) of the parking lot (e.g., 111) detects a vehicle (e.g., 151 or 153) at an entrance (e.g., 131 or 135) of the parking lot (e.g., 111).

For example, when the vehicle (e.g., 151 or 153) at an entrance (e.g., 131 or 135) of the parking lot (e.g., 111), a parking application (207) for or in the vehicle (e.g., 151 or 153) can communicate with a server (e.g., 101) via a wireless local connection (e.g., using a wireless local area network, such as Wi-Fi, or a wireless personal area network, such as Bluetooth). The limited signal coverage area of the communication connection confirms that the physical presence of the vehicle or the mobile device running the parking application (207).

At block 305, the server (e.g., 101) determines whether the peer to peer network (201) recognizes a reservation for the vehicle (e.g., 151 or 153).

For example, each respective node (e.g., 101) in the peer to peer network (201) is configured to use its parking application (207) to determine whether the reservation is valid based on records stored on the respective node (e.g., 101). When a majority of nodes (e.g., 211, 213, ... ) in the peer to peer network (201) confirming validity of the reservation record, the reservation can be recognized.

For example, the vehicle (e.g., 153) is permitted to enter the parking lot (e.g., 111) in response to the reservation being recognized by the consensus of the peer to peer network (201) and not permitted to enter the parking lot (e.g., 111) when the reservation is not recognized by the consensus of the peer to peer network (201).

At block 307, the server (e.g., 101) of the parking lot (e.g., 111) permits the vehicle (e.g., 151 or 153) to enter the parking lot (e.g., 111) based on recognition of the reservation for the vehicle (e.g., 151 or 153) by a majority of nodes (e.g., 211, 213, ... ) in the peer to peer network (201).

At block 309, a parking application (207) can optionally guide the vehicle (e.g., 151 or 153) from the entrance to an available park space (e.g., 121 or 125) in the parking lot (e.g., 111).

At block 311, the server (101) confirms occupation of the parking space (e.g., 121 or 125) by the vehicle (e.g., 151 or 153).

For example, a sensor can be configured to detect that the parking space (125) is being occupied by a vehicle (153).

For example, the parking application (207) can report, to the server (101) and/or the peer to peer network (201), the arrival of the vehicle (153) at the parking space (125), based on the result of the navigational guidance and/or the position of the vehicle (153) as determined by the parking application (207).

At block 313, the decentralized, distributed database (203) records occupation of the parking space (e.g., 121 or 125).

For example, the server computer (101) can generate or finalize an activity record (205) for the digital token representing the parking space (125), in response to a wireless communication with a parking application (207) of a vehicle (153), or a mobile device connected to the infotainment system of the vehicle (153). The limited range of the wireless communication indicates the location of the vehicle (153) in the parking lot (111). The server computer (101) and/or the application (207) can broadcast the activity record in the peer to peer network (201).

Since the activity record indicates that a vehicle (153) is parked in the parking space (125) represented by the digital token, via a transaction record of a transfer of the digital token from the server computer to the parking application, the availability information of the parking space (125) is updated in the decentralized, distributed database (203). The updated availability information can be used by other vehicles to plan travel, make reservation, and/or find alternative parking lots and/or parking spaces.

Figure 4:
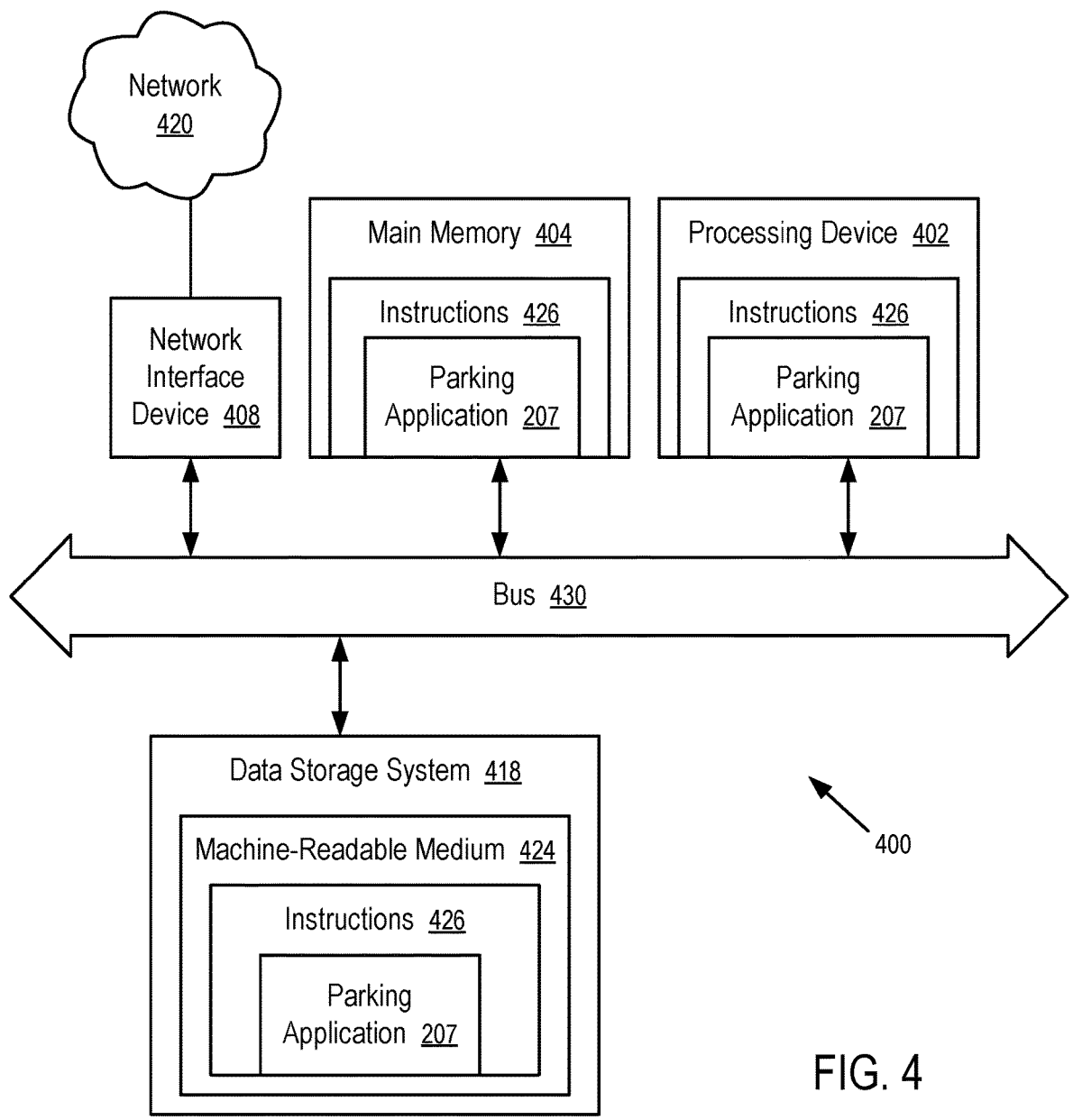
FIG. 4 is a block diagram of an example computer system in which embodiments of the present disclosure can operate.

FIG. 4 is a block diagram of an example computer system in which embodiments of the present disclosure can operate.

FIG. 4 illustrates an example machine of a computer system (400) within which a set of instructions, for causing the machine to perform any one or more of the methodologies discussed herein, can be executed. In some embodiments, the computer system (400) can correspond to a server computer system (e.g., 101 of FIG. 1); and in other embodiments, the computer system (400) can correspond to a vehicle (e.g., 153 of FIG. 1) or a mobile device connectable to an infotainment system of the vehicle. The computer system (400) can be coupled to, or utilized to perform the operations of a parking application (207) (e.g., to execute instructions to perform operations corresponding to the parking application (207) described with reference to FIGS. 1-3). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system (400) includes a processing device (402), a main memory (404) (e.g., read-only memory (ROM), flash memory, dynamic random access memory (DRAM) such as synchronous DRAM (SDRAM) or Rambus DRAM (RDRAM), static random access memory (SRAM), etc.), and a data storage system (418), which communicate with each other via a bus (430) (which can include multiple buses).

Processing device (402) represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device (402) can also be one or more special-purpose processing devices such as an application specific integrated circuit (ASIC), a field programmable gate array (FPGA), a digital signal processor (DSP), network processor, or the like. The processing device (402) is configured to execute instructions (426) for performing the operations and steps discussed herein. The computer system (400) can further include a network interface device (408) to communicate over the network (420).

The data storage system (418) can include a machine-readable storage medium (424) (also known as a computer-readable medium) on which is stored one or more sets of instructions (426) or software embodying any one or more of the methodologies or functions described herein. The instructions (426) can also reside, completely or at least partially, within the main memory (404) and/or within the processing device (402) during execution thereof by the computer system (400), the main memory (404) and the processing device (402) also constituting machine-readable storage media.

In one embodiment, the instructions (426) include instructions to implement functionality corresponding to a parking application (207) (e.g., the parking application (207) described with reference to FIGS. 1-3). While the machine-readable storage medium (424) is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A parking system, comprising:
a plurality of parking lots, wherein digital tokens are configured to represent individual and separate parking spaces in the parking lots, transfers of the digital tokens among computing systems represent changes in respective parking spaces being used by corresponding owners of the computing systems, and changes in users of the parking spaces cause transfers of respective digital tokens among respective computing systems operated by the users; and
a plurality of server computers, each respective server computer in the plurality of server computers configured to control a respective parking lot in the plurality of parking lots;
wherein the server computers are connected via a communications network to form a peer to peer network of computing nodes, the respective server computer configured as a respective computing node in the peer to peer network of computing nodes;
wherein the peer to peer network of computing nodes is configured to host a decentralized, distributed database;
wherein the database is configured to store activity records of transfers of the digital tokens among entities, including the server computers representing providers of the parking spaces and applications representing vehicles using the parking spaces;
wherein the respective server computer is configured to broadcast a parking activity record in the peer to peer network to cause one or more additional computing nodes in the peer to peer network to store the parking activity record in the decentralized, distributed database having a copy of the parking activity record maintained by each of the one or more additional computing nodes; and
wherein the respective server computer is configured to control the respective parking lot based at least in part on network consensus on the activity records stored in the decentralized, distributed database.

2. The parking system of claim 1, wherein the decentralized, distributed database is implemented via a blockchain technique.

3. The parking system of claim 1, wherein each respective parking space among the parking spaces of the parking lots is represented by a digital token; and the activity records identify transfer of the digital token to or from parking applications.

4. The parking system of claim 3, wherein advanced driver-assistance systems of vehicles include the parking applications configured to transfer digital tokens representing the parking spaces of the parking lots.

5. The parking system of claim 3, wherein infotainment systems of vehicles are connected to mobile devices running the parking applications configured to transfer digital tokens representing the parking spaces of the parking lots.

6. The parking system of claim 3, wherein the respective server computer is configured to generate an activity record for the digital token in response to a wireless communication with a parking application of a vehicle or a mobile device in the respective parking lot; and the respective server computer is further configured to broadcast the activity record for the digital token in the peer to peer network.

7. The parking system of claim 6, wherein the activity record indicates that the vehicle is parked in the respective parking space, represented by the digital token, by a transaction record of a transfer of the digital token from the respective server computer to the parking application.

8. The parking system of claim 7, further comprising:
a sensor configured to detect that the respective parking space is being occupied by a vehicle.

9. A method in a parking system, comprising:
connecting a plurality of server computers via a communications network to form a peer to peer network of computing nodes, each respective server computer in the plurality of server computers configured to control a respective parking lot in a plurality of parking lots, the respective server computer configured as a respective computing node in the peer to peer network of computing nodes, wherein digital tokens are configured to represent individual and separate parking spaces in the parking lots, transfers of the digital tokens among computing systems represent changes in respective parking spaces being used by corresponding owners of the computing systems, and changes in users of the parking spaces cause transfers of respective digital tokens among respective computing systems operated by the users;
hosting, by the peer to peer network of computing nodes, a decentralized, distributed database, wherein the database is configured to store activity records of transfers of the digital tokens among entities, including the server computers representing providers of the parking spaces and applications representing vehicles using the parking spaces;
broadcasting, by the respective server computer, a parking activity record in the peer to peer network to cause one or more additional computing nodes in the peer to peer network to store the parking activity record in the decentralized, distributed database having a copy of the parking activity record maintained by each of the one or more additional computing nodes; and controlling, by the respective server computer, the respective parking lot based at least in part on network consensus on the activity records stored in the decentralized, distributed database.

10. The method of claim 9, wherein the decentralized, distributed database is implemented via a blockchain technique.

11. The method of claim 9, wherein each respective parking space among the parking spaces of the parking lots is represented by a digital token; and the activity records identify transfer of the digital token to or from parking applications.

12. The method of claim 11, further comprising:
transferring, by parking applications included in advanced driver-assistance systems of vehicles, digital tokens representing the parking spaces of the parking lots.

13. The method of claim 11, further comprising:
transferring, by the parking applications running in mobile devices connected to infotainment systems of vehicles, digital tokens representing the parking spaces of the parking lots.

14. The method of claim 11, further comprising:
generating, by the respective server computer, an activity record for the digital token in response to a wireless communication with a parking application of a vehicle or a mobile device in the respective parking lot; and
broadcasting, by the respective server computer, the activity record for the digital token in the peer to peer network.

15. The method of claim 14, further comprising:
indicating, via the activity record, that the vehicle is parked in the respective parking space, represented by the digital token, by a transaction record of a transfer of the digital token from the respective server computer to the parking application.

16. The method of claim 15, further comprising:
detecting, by a sensor, that the respective parking space is being occupied by a vehicle.

\* \* \* \* \*